April 7, 1953 H. A. MOE 2,633,618

BUTTONHOLE AND METHOD OF MAKING BUTTONHOLES

Filed Dec. 11, 1944 3 Sheets-Sheet 1

HERMAN A. MOE

*INVENTOR.*

BY John J. Hanrahan

April 7, 1953 H. A. MOE 2,633,618
BUTTONHOLE AND METHOD OF MAKING BUTTONHOLES
Filed Dec. 11, 1944 3 Sheets-Sheet 2

HERMAN A. MOE
*INVENTOR.*
BY John A. Hanrahan

BUTTONHOLE AND METHOD OF MAKING BUTTONHOLES

Filed Dec. 11, 1944 3 Sheets-Sheet 3

HERMAN A. MOE
INVENTOR.
BY John J. Hanrahan

Patented Apr. 7, 1953

2,633,618

UNITED STATES PATENT OFFICE 2,633,618

BUTTONHOLE AND METHOD OF MAKING BUTTONHOLES

Herman A. Moe, Warwick, R. I., assignor to Better Products, Inc., a corporation of Rhode Island Application December 11, 1944, Serial No. 567,601

4 Claims. (Cl. 24—202)

This invention relates to new and useful improvements in garments and the like and has particular relation to buttonholes for garments and to methods of making buttonholes.

The objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

Figure 3:
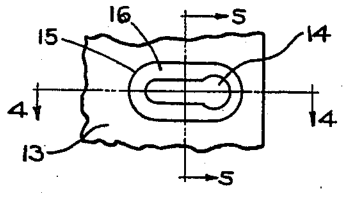
Fig. 3 is a similar view showing a further step.
Figure 4:
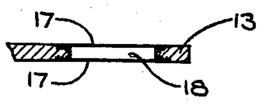
Figure 5:
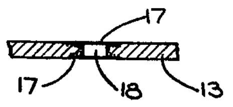
Figure 6:
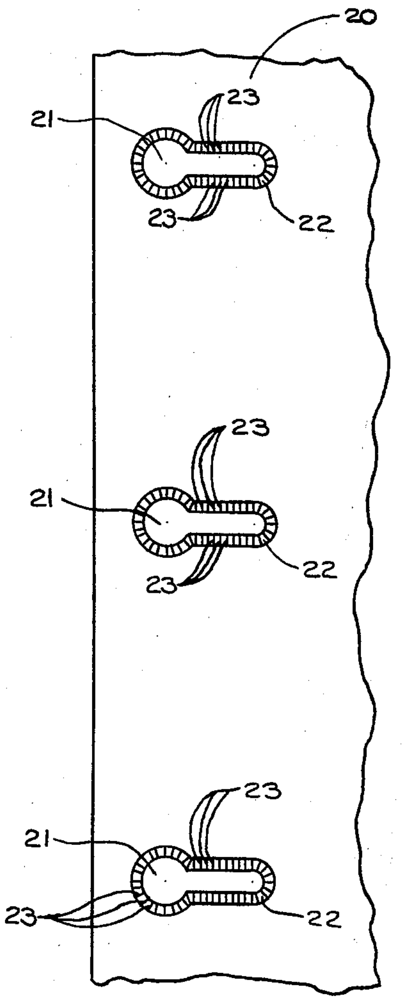
Figure 7:
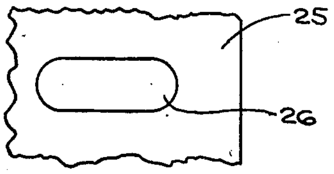
Figure 8:
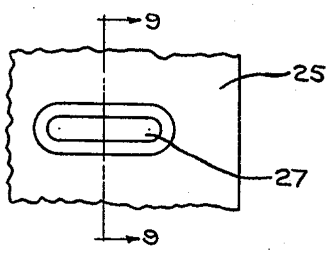
Figure 9:
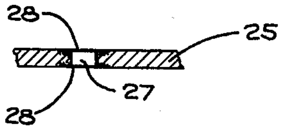
Figure 10:
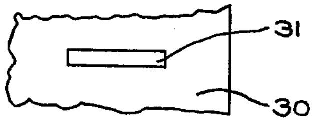
Figure 11:
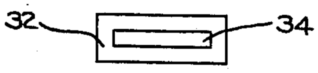
Figure 12:
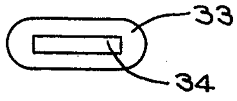
Figure 13:
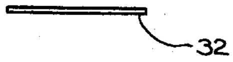
Figure 14:
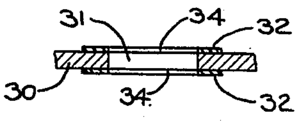
Figure 15:
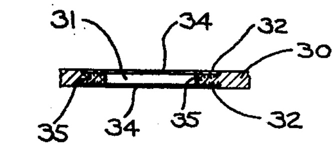
Figure 16:
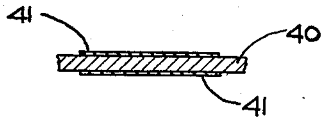
Figure 17:
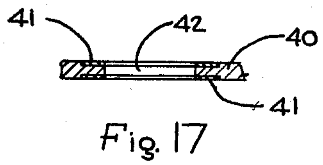
Figure 18:
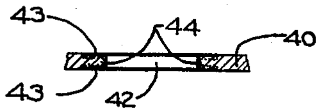
Figure 19:
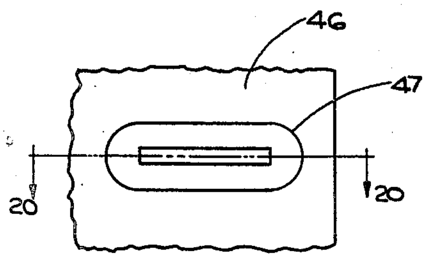
Figure 23:
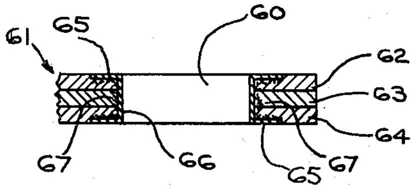
Figure 20:
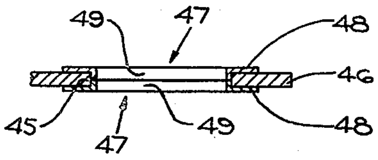
Figure 24:
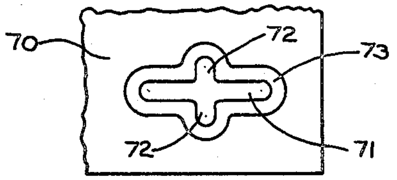
Figure 21:
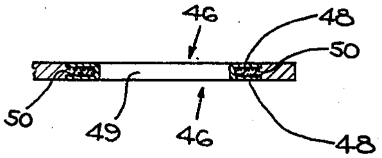
Figure 22:
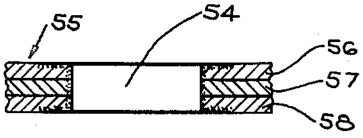

Figs. 4 and 5 are sectional views on the lines 4—4 and 5—5, respectively, of Fig. 3;

Fig. 6 is a plan view showing a portion of a garment having several buttonholes made simultaneously, in accordance with the invention;

Fig. 7 is a plan view showing a step in a slightly different method of making buttonholes;

Fig. 8 is a view similar to Fig. 7 and showing a further step in the same method;

Fig. 9 is a sectional view taken substantially along the plane of the line 9—9 of Fig. 8;

Fig. 10 is a plan view showing a step in another method of making buttonholes in accordance with the invention;

Fig. 11 is a plan view of a preformed part to be used in practicing the method of Fig. 10;

Fig. 12 is a plan view showing a variation of the part of Fig. 11;

Fig. 13 is an edge or side elevational view of the part of Fig. 11;

Fig. 14 is a sectional view showing a further step in the method of Fig. 10;

Fig. 15 is a sectional view through the finished product made by the method of Figs. 10–14;

Fig. 16 is a sectional view through a piece of fabric having parts applied and illustrating a step in a variation of the method illustrated in Figs. 10–15;

Fig. 17 is a similar view illustrating a further step in the method of Fig. 16;

Fig. 18 is a sectional view through the finished product made by the methods of Figs. 16 and 17;

Fig. 19 is a plan view illustrating a step in another method of making the buttonhole of the invention;

Fig. 20 is a sectional view taken as along the plane of the line 20–20 of Fig. 19;

Fig. 21 is a sectional view similar to Fig. 20 but of the finished product;

Fig. 22 is a sectional view of a buttonhole through a material including a plurality of layers, the layers being all adhered in the vicinity of the buttonhole or in a zone about the buttonhole by the method of making the latter;

Fig. 23 is a view illustrating the method of Fig. 21 when applied to a material including a plurality of layers;

Fig. 24 is a plan view showing a new buttonhole shape; and

Figure 25:
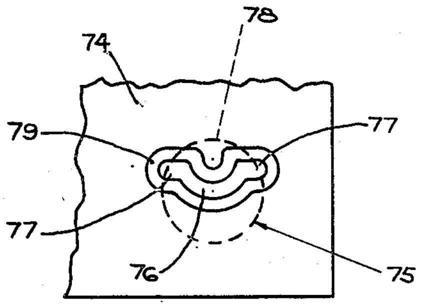

Fig. 25 is a similar view showing another buttonhole shape.

Figure 1:
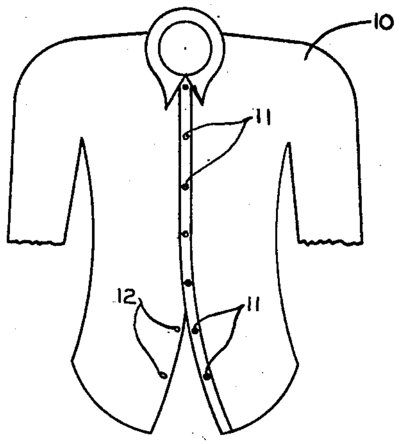
Fig. 1 is a front elevational view of a shirt having buttonholes in accordance with the invention.
Figure 2:
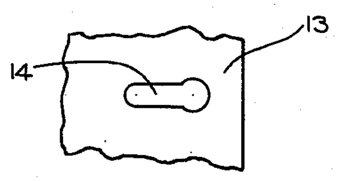
Fig. 2 is a plan view, on a larger scale, showing a step in the method of forming the buttonhole of the invention.

Referring in detail to the drawings the shirt 10 shown in Fig. 1 is provided with buttons 11 and buttonholes 12, the latter being constructed according to the invention and by a method to be hereinafter disclosed. Shirt 10 is shown merely to represent any garment or any piece of material so that its structure, aside from the buttonholes 12, is of no importance here. The buttonholes of the invention may be applied to any garment or to a piece of material which may later be applied to a garment to provide the same with buttonholes. For example, the buttonholes of the invention may be formed in a strip of material to be later sewed or otherwise attached to an edge of a garment.

Referring now to Figs. 2 through 5 at 13 is shown a portion of any material and it may be a piece of a garment or a part of a strip or the like later to be attached to an edge of a garment. When making a buttonhole in accordance with the invention a hole 14 is formed, as, for example, punched in the piece 13. The hole 14 may be of the desired size and shape. After hole 14 has been formed the material 13 is impregnated with a plastic in a zone extending about the hole. This is suggested by the line 15 in Fig. 3 and the impregnated area is defined by said line and is designated 16.

After the hole 14 has been formed through the material 13 the plastic may be applied in either liquid or powdered form or as one or a pair of preformed pieces although the method of using the preformed pieces or piece will later be considered in detail. After the plastic is applied it is by heat and/or pressure caused to enter the material 13 in the zone 16 so that such portion of the material is impregnated with the plastic. This impregnation is suggested by the stippling effect in the sectional views Figs. 4 and 5. The molding operation involving the use of heat and pressure also results in the formation of a thin film of the plastic over the outer surfaces of the zone 16 and also over the edges of the opening or hole 14. The film on the outer surfaces of zone 16 is designated 17 and that portion of the film over the edges of the opening 14 is designated 18 and is best seen in Figs. 4 and 5.

Where the material 13 is a woven or other type fabric formed of threads it will be seen that the impregnation of its zone portion 16 about the buttonhole 14 by the plastic serves to bind together the threads and the thread ends about the edges of the punched or otherwise formed hole. Film 17 formed over the area or zone 16 and the film portion 18 over or about the edges of the hole 14 further serve to bind in and protect and reenforce any loose threads or thread ends. Various plastics may be used for my present purpose and some of them will be mentioned hereinafter. The plastic used may be colorless or it may be of the color of the material 13 or of a color to contrast therewith. Sharp, bright contrasts may be obtained particularly for use in sport clothes.

Plasticizers and inhibitors may be combined with the plastic used to render and maintain the same flexible. Generally the film 17—18 is very thin so as not to make the buttonhole stiff and/or bulky. In addition to covering and sealing in the threads about the edges of the hole the plastic provides a wear portion of long useful life and one that will not fray and become ragged in appearance. That is, the usual thread binding applied to buttonholes is omitted and this is a savings in effort and in addition eliminates the portion which normally first wears so that the buttonholes of the invention remain sharp and neat in appearance for the life of the garment.

Fig. 6 shows a piece or strip of material 20 provided with three buttonholes 21. This figure is merely to illustrate that a plurality of the buttonholes of the invention may be simultaneously made, that all of the three holes 21 may be made at one time and in fact all the buttonholes along an edge of a garment may be simultaneously made. Where it is desired or deemed best the holes of a garment are made all at one time.

In Fig. 6 the buttonholes 21 were first punched or otherwise formed in the material 20 and thereafter the plastic was applied to the zones 22 about each such hole and was by heat and/or pressure or otherwise molded in place. In the molding operation or the operation wherein the plastic is caused to impregnate and adhere to and form a film over the material in the zones 22 and about the edges of the holes 21, the plastic film may be molded to simulate threads. Thus in Fig. 6 the films on the outer surfaces of zones 22 and as they enter the holes 21 are molded or formed with lines 23 to simulate threads. This matter of simulating threads may be carried out in the method disclosed in connection with the Figs. 2 through 5 and in the other methods to be hereinafter disclosed.

Referring now to Figs. 7 through 9 according to the method there disclosed a piece of material 25, as a portion of a garment, is impregnated with plastic material in a restricted zone 26. The plastic may be applied in either a powdered or liquid form and is caused to enter into and impregnate the material in the zone 26. The impregnation or the penetration of the material by the plastic may be brought about through the use of heat and/or pressure as in a molding operation.

After the impregnated zone 26 has been formed a buttonhole 27 is formed in such zone. The buttonhole may be formed by punching out a portion of the zone or by any other cutting operation. The impregnated zone may be rather stiff as compared with other portions of the material 25 and thus a clean neat hole may be punched. The plastic is through the material in the zone 26 and thus the threads at the edges of the hole and the thread ends at such edges are bound in place by the set plastic. This presence of the plastic entirely about the edges of the buttonhole 27 is illustrated by the stippling effect in Fig. 9.

The plastic used in the method disclosed in connection with Figs. 7, 8 and 9 is the same as that mentioned in connection with the figures first described and may be colored or not and depending on the particular plastic employed will contain plasticizers, inhibitors, fillers, etc. Aside from the fact that the formed film 28 in this modification is formed only on the two outer surfaces of the zone 26 and not about the edges of the opening 27 as in the case of the film portion 18 in Figs. 4 and 5, when the hole 27 is punched, no film is formed about the edges of such hole although a film may be formed about said edge by having the punch heated or by the insertion of a heated form into the opening after the latter is made.

Figs. 10 through 15 illustrate a further method of making the buttonhole of the invention. In these figures 30 is a piece of material, as a portion of a garment. A hole 31 is punched or otherwise formed in the material 30. Thereafter a pair of preformed pieces of plastic material are placed against opposite sides of the material 30 and molded to it. Such pieces may be rectangular, as the piece 32 of Figs. 11 and 13, or it may be oval or otherwise curved as is the piece 33 of Fig. 12.

Each of these pieces is perforated as at 34, the perforations being preferably of the shape and size of the hole 31 through the piece of material 30. As above suggested the pieces 32 are placed against opposite sides of the material 30 and in Fig. 14 with the perforations 34 of such pieces in registration or substantially in registration with the hole 31. Then through the application of heat and/or pressure, as in a molding operation, the pieces 32 (or the pieces 33 or any other shape desired) are molded to the material 30. The pieces are adhered to the material and some of the plastic of the pieces is formed into the material 30 adjacent the edges of the hole and in fact to the edges of such hole as suggested by the stippling 35 in Fig. 15. At this same time the pieces are bodily forced toward one another so that in the finished product the pieces are not above the surfaces of the material 30 but are substantially flush therewith as in Fig. 15.

The pieces or preforms are made of tough flexible plastic and are quite thin whereby not to be bulky and whereby the garment having the buttonhole may be easily buttoned and unbuttoned. Clearly the pieces adhere to the material 30 and serve to protect the same about the hole 31 and prevent fraying of the material of the garment about such hole. The pieces or preforms may be colored if desired and contain plasticizers and inhibitors. The material of the preforms impregnating the material 30 as at 35 bind in all threads and thread ends at the edges of the hole 31. As in the instance of the form shown in Fig. 6 the buttonhole of the other figures thus far described may be formed with grooves or ribs in their plastic films to simulate binding threads. That is ridges or grooves may be molded into the films 17, 28 and 32 to simulate the threads of the usual thread binding.

Referring now to the method of Figs. 16, 17 and 18 a piece of material is there designated 40. According to this method a pair of pieces or preforms 41 of a plastic material are applied one to each side of the material 40. Preforms 41 are not perforated and are of any chosen size and shape. After the preforms are in place a hole 42 is made through them and the material 40 leaving the parts as in Fig. 17.

Thereafter heat and pressure are used to force the plastic into the material 40 in a zone about the hole 42 and the plastic impregnations thus accomplished extends from the edges of such hole for a slight distance about the same as determined by the sizes of the preforms used. This treatment brings about the structure illustrated in Fig. 18 wherein the preforms no longer exist but the material of them has been heated to flow and has been forced into and is impregnating the material 40 but provides a thin film 43 on the surfaces of the material 40. All threads and thread ends of the material 40 at the edges of the hole 42 are held in place by the plastic functioning as a binder and also forming a film 44 over such edge.

Substantially the same results may be obtained by causing the preforms to flow into the material from the positions of Fig. 16 and thereafter the hole 42 may be formed through the impregnated zone of the material 40 and in such instance the step suggested at Fig. 17 is omitted and the process is somewhat the same as that disclosed in Figs. 7, 8 and 9, the plastic being applied as a piece rather than in powdered or liquid form.

Figs. 19, 20 and 21 suggest a somewhat different method. According to that method a hole 45 is formed in a piece of material 46 and then a pair of preforms 47 are disposed one at each side of the material 46 and each such preform includes a flange-like portion 48 disposed against an outer side of the material 46 and a neck-like portion 49 entering the hole 45. Such neck-like portions are tubular and entering from opposite sides of material 46 abut intermediate the sides of the latter as suggested in Fig. 20.

After this assembly is made the same is treated to a molding operation and under heat and some pressure the preforms are forced to the positions or conditions of Fig. 21 which is a sectional view through the finished product. In Fig. 21 it is noted that some of the material of the preforms has been caused to impregnate the material 46 as suggested by the stippling at 50. Further the neck-like portions 49 have been caused to flow together and now serve to connect the flange-like portions 48 so that the plastic forms a film over the outer surfaces of the material 46 about the new buttonhole and in addition forms a film over the edges of the material 46 in the hole therethrough. Thus the material about the buttonhole is protected and the threads and thread ends at said hole are effectively sealed in place.

Fig. 22 shows the new construction of buttonhole 54 through a piece of material 55 including a plurality of layers 56, 57 and 58. This construction of buttonhole may be made by methods previously considered. In making buttonhole 54 the material 55 is impregnated in a restricted zone with a plastic and then the buttonhole is punched or otherwise formed. Alternatively the hole may be formed in material 55 and thereafter a restricted zone of the material about such hole may be impregnated with the plastic to protect the material about the buttonhole and to bind in threads and thread ends at the edges of such hole.

Therefore, in the buttonhole 54 the layers of material at the edges of the hole are bonded together by the impregnating plastic as suggested by the stippling in Fig. 22. The plastic may be applied as a powder or a liquid or it may be applied in the form of pieces or preforms as in Figs. 10 through 15 and in Figs. 19–21.

Fig. 23 illustrates a buttonhole 60 formed in a piece of material 61 including a plurality of layers 62, 63 and 64. In this figure the buttonhole 60 has been formed by the method described in connection with Figs. 19–21 and the material 61 about the buttonhole is covered and protected by a film 65 and about the edges of the hole therethrough by a film portion 66, it being understood that the film portions 65 and 66 are integral having been made so in the final treatment of the plastic. The stippling at 67 is to illustrate the manner in which some of the plastic has been caused to penetrate and impregnate the material 61 and to bind together its layers 62, 63 and 64 about the edges of the buttonhole.

Fig. 24 serves to illustrate a new shape of buttonhole providing for ease in buttoning and unbuttoning a garment. In the figure a piece of material 70 has an elongated opening 71 formed therein and a pair of short openings 72 communicate with the opening 71 intermediate the ends of the latter. Slit-like openings 72 are shown as a bit wider than the slit-like opening 71. Material 70 is reenforced in a restricted zone 73 beginning at the edges of the opening 71—72 and extending back from such edges. The impregnation and reenforcing of the zone 73 may be accomplished by any of the methods heretofore described.

Fig. 25 shows a piece of material 74 having a buttonhole 75 comprising an arcuate portion 76 and lateral end portions 77. This construction is also for ease in buttoning and unbuttoning of a garment and the dotted lines show the relation of a button 78 to such buttonhole. A plastic impregnated and reenforced but restricted zone 79 is shown about the buttonhole 75.

In any of the various modifications shown the plastic used may be colored to contrast with or to match the material to which it is applied or it may be colorless as desired. Preferably the plastic should be impervious to water and water and soap whereby not to be softened or destroyed in washing where the garment is subject to washing. Further the plastic may be thermoplastic or thermosetting but in the former case should have a softening point high enough, when used in a garment likely to be laundered, to withstand water of washing temperature and to withstand ironing.

The shape of the film provided over the zones about the buttonholes of a garment is immaterial to the invention. It or they may be round, oval, square, oblong, or other multi-sided shapes and of any desired size. The buttonholes may be formed one at a time or a plurality of them, as all the buttonholes of a single garment, may be formed at one time as suggested in Fig. 6. Between the zones about the buttonholes the material is not impregnated or otherwise changed and so retains its usual characteristics. The forming of ridges or grooves to simulate threads is a feature that may be used as part of any of the methods herein disclosed. The buttonholes of the invention may be applied to any type of material as woven, or knitted or in fact to integral pieces, as, for example, pieces of leather in windbreakers, etc.

As above stated the plastic used may be thermoplastic or thermosetting or mixtures of the two where the latter gives desirable properties. Polyvinyl butyral resin has been found desirable for my present purposes although it will be understood that the invention is not limited to the use of such resin. Vinyl acetal resins have many characteristics favoring their use in the present invention but many other resins of the vinyl group and of other groups may be used.

Celluloses may be used as well as some of the synthetic elastomers and in this connection it is pointed out that the plastic used need not be synthetic since natural resins may in some instances be used particularly when combined with other materials. Phenol formaldehyde, urea formaldehyde, melamine formaldehyde, analine formaldehyde, phenol furfural compounds, lignin plastic substances, polystyrene, nylon resins, methyl methacrylate resins, etc., may be used. Of the cellulose resins the ethyl cellulose is best for my purpose.

Having thus set forth the nature of my invention, what I claim is:

1. A buttonhole construction comprising a piece of pervious material having a buttonhole therethrough, a thin flexible plastic film in a restricted zone about the edges of said buttonhole at opposite sides of said material, a flexible plastic extending entirely through the portions of said material between said films, and said films and the plastic extending through said material between said films integral.

2. The method of making a buttonhole in a piece of material comprising forming a hole through the material, then by heat and pressure forcing a plastic against, into and through said material in a restricted zone beginning with the edges of said hole and extending about the same, and forming said plastic in a film over the opposite outer surface portions of said zone of the material.

3. The method of finishing a buttonhole in a piece of material comprising under heat and pressure forcing a plastic against, into and through said material in a restricted zone beginning with the edges of a hole in said material and extending radially outwardly of said edges, and forming integral portions of said plastic into a film over the opposite outer surface portions of said zone of the material.

4. The method of finishing a buttonhole in a piece of material including a plurality of layers comprising under heat and pressure forcing a plastic against, into and through the layers of said material in a restricted zone beginning with the edges of a hole in said material and extending radially outwardly of said edges, and forming integral portions of said plastic into films over the opposite outer surface portions of said zones of the outer layers of said material.

HERMAN A. MOE.

REFERENCES CITED

The following references are of record in the file of this patent:

UNITED STATES PATENTS

| Number | Name | Date |
|---|---|---|
| 149,035 | Gardner | Mar. 31, 1874 |
| 308,029 | Beck | Nov. 11, 1884 |
| 423,327 | Keeler | Mar. 11, 1890 |
| 586,770 | Kempshall | July 20, 1897 |
| 903,778 | Richards | Nov. 11, 1908 |
| 1,004,869 | Goffin | Oct. 3, 1911 |
| 1,025,682 | Cardinal | May 7, 1912 |
| 1,122,280 | Kempshall | Dec. 29, 1914 |
| 1,978,620 | Brewster | Oct. 30, 1934 |
| 2,093,425 | Dreyfus | Sept. 21, 1937 |
| 2,095,209 | Brownsdon | Oct. 5, 1937 |
| 2,126,759 | Dreyfus | Aug. 16, 1938 |
| 2,319,307 | Eddy | May 18, 1943 |
| 2,370,028 | Freiberg | Feb. 20, 1945 |
| 2,387,416 | Stuart | Oct. 23, 1945 |

FOREIGN PATENTS

| Number | Country | Date |
|---|---|---|
| 5,434 | Great Britain | Mar. 14, 1895 |